May 8, 1962 P. PASSAU 3,033,461

SIGNAL CONVERSION APPARATUS FOR DATA-TELEMETER SYSTEMS AND REMOTE CONTROL SYSTEMS

Filed June 21, 1957 3 Sheets-Sheet 3

United States Patent Office 3,033,461

Patented May 8, 1962

3,033,461

SIGNAL CONVERSION APPARATUS FOR DATA-TELEMETER SYSTEMS AND REMOTE CONTROL SYSTEMS

Philippe Passau, Loverval, Belgium, assignor to Societe Anonyme Ateliers de Constructions Electriques de Charleroi, Brussels, Belgium, a corporation of Belgium Filed June 21, 1957, Ser. No. 667,195
Claims priority, application France June 27, 1956
1 Claim. (Cl. 235—181)

This invention relates to measurement processes, more particularly to remote control systems and data-telemetering systems and is particularly directed at improvements in the information efficiency, reliability, information accuracy of telemetry measurements or data and at a decrease of the cost of transmission. Any means of transmission may be used, e.g. radio links or wires.

Such physical quantities as delivered by physical systems e.g. the temperature of furnaces, the angular position of mechanical parts, the voltage of electrical machines or the output of any measuring apparatus always depend to a more or less extent on their preceding values because the energy in the system cannot vary instantaneously. Therefore, the information content of the continuous output or signal delivered by the physical system is redundant. In language of statisticians the redundancy of the signal is, as known, characterized by the autocorrelation function of the signal.

In order to lower the cost of transmission it will be useful to construct from the original signal a non redundant signal having the same information content but which needs less power for its transmission. This non redundant signal may be represented by a purely random or stochastic time function (also called contingent conjectural variable) and the energy of its transmission, as it is known, is minimum compared with the energy of transmission of any redundant signal of the same information content. For practical purposes, the original signal must be reconstructed at the receiving station.

The invention also concerns the elimination of systematic errors introduced by measuring equipment or transducers. According to its own physical constitution or characteristics such equipment and transducers may introduce in the signal more redundancy, usually known as time response, caused by way of example, by the inertia of the mechanical or electrical components of the equipment. This supplementary redundancy may be suppressed by a device according to the invention which eliminates only the redundancy introduced by the measuring equipment or transducer. If such deformated signal is to be transmitted, first the supplementary redundancy may be suppressed and afterwards all the redundancy may be withdrawn in a second device in order to transmit a signal of almost zero redundancy. After reception a signal is reconstructed having no more the supplementary redundancy produced by said measuring equipment.

In order to illustrate the invention by an example, remember that the inertia of a measuring apparatus can be considered relatively small, but nevertheless it exists and it becomes a disturbing factor, greater in proportion as the measurement has to be more precise, or particularly greater in proportion as the measurement has to be made rapidly. Rapidity of measurement becomes of chief importance in modern wholly automatic closed loop remote control systems or radio command links where the measurement of a physical quantity often serves to regulate and control the quantity itself. In other cases, for example when a detection apparatus is designed, for automatically tracking an airborne vehicle, measurement of the co-ordinates of the moving vehicle must suffice for instantaneous positioning of the detection apparatus, and accordingly the co-ordinate data must be transmitted rapidly and accurately, particularly rapid acceleration changes must be instanteously measured or read.

A typical example of redundancy in a telemetry system is the case of an incoming signal received in the measurement apparatus wherein it is converted into a signal comprising, in addition to the original signal, constantly superimposed information due to the characteristics of the measuring apparatus, and serving no useful purpose. In other words, the signal added by the measuring apparatus are redundant. Generally the redundancy of these signals may be the more intense in proportion as the measurements have to be effected rapidly. If the measuring apparatus can be considered as perfectly faithful in relation to the quantity measured, for example, detection apparatus indicating the position of a very heavy ship, the original signal is already redundant, for it contains implicitly certain information constantly renewed and caused by the characterstics of the ship, inertia among others, such information having no inerest as regards the acquisition of data on the co-ordinates of its position. In supressing the redundancy of the signal, the invention must therefore allow the establishment of a contingent conjectural signal, comprising solely the information of interest which need not necessarily correspond to the original signal. In the cited example, signal representing the successive positions of the rudder of the ship, would be an example of contingent information because the rudder may take any position at any moment. The contingent conjectural signal referred to will therefore be a signal which may taken any value at any moment and wherefrom the successive co-ordinates may be recalculated. This results in a considerable diminution of the amount of information to be transmitted, because if the ship describes a curve with constant speed having the rudder fixed at a constant angle with respect to its axis, we only should know the speed and the angle of the rudder in order to calculate the successive varying co-ordinates.

Accordingly a principal object of the present invention is therefore the supression of the redundancy of information signals during transmission and the restoration of the original signal after reception of the transmitted signals.

Another object is to provide a simple, reliable signal conversion apparatus for eliminating errors caused by the inherent time-lag characteristics of the apparatus or measuring devices in radio data-telemeter systems, and remote indicating and control systems.

A feature of the signal conversion apparatus in accordance with the invention is that an apparatus for conversion of continuously varying values is provided, in which there is extracted from a memory device a signal introduced at a preceding moment, this signal being reduced by a given-factor in a reducing device and superimposed after such reduction on a later signal. The time of storage of the signal in the memory device and the factor of reduction applied are adapted to be varied according to data supplied by a calculator from the signal correlation function. In order to do this there are provided preferably a servomotor system determining the time of storage of the signal in the memory device and a servomotor system determining the reduction factor in the reducing device.

The time of storage of the signal in the memory device and the factor of reduction are preferably chosen approximately equal to the co-ordinates of the first minimum of the auto-correlogram of the original signal.

The same elements and principles are utilised at the date-transmitting and receiving stations but only a single calculator of the auto-correlation function is necessary, this being located at the transmitting station. The data at the latter control the servomotor systems both at the transmitting station and, after transmission and reception, at the receiving station.

Other objects, features and advantages of the invention will be understood from the following description and claim in conjunction with the accompanying drawings which illustrate by way of example a preferred embodiment of the system, and in which:

Generally it may be stated that the redundancy of a signal representing a physical quantity is the expression of the fact that each value of such a quantity is affected by its history, that is to say it depends to a certain extent upon the values of the same quantity at preceding moments. A contingent conjectural variable is free from redundancy. The invention therefore allows of separating the influence of the preceding values upon the last measured value of the conjectural variable, itself absolutely arbitrary. As first approximation, it suffices to take account of a single value of measurement, preceding in relation to the measurement under consideration, and to cause it to intervene with an importance which depends upon the redundancy of the measured signal. It is therefore possible to write in mathematical language:

$$v(t)=u(t)-pu(t-\tau) \quad (1)$$

In the above formula $v(t)$ signifies the contingent conjectural variable, $u(t)$ the measured value, $\tau$ a small lapse of time fixed and $p$ a constant coefficient.

Figure 1:
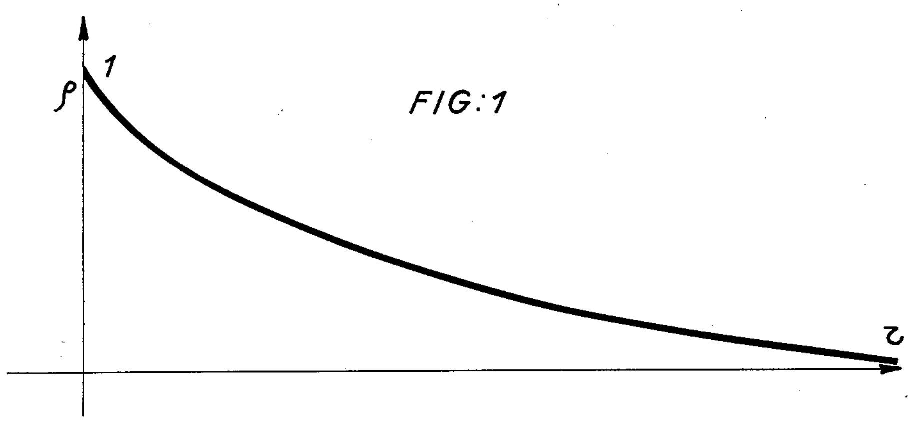
FIGS. 1 to 3 are auto-correlograms explanatory of the invention.

The value of the coefficient $p$ in the Formula 1 depends on the magnitude $\tau$. It can easily be understood that $p$ cannot exceed unity and that $p$ tends toward zero when $\tau$ becomes sufficiently great, as shown in FIG. 1 of the accompanying drawings.

The coefficient $p$ is also known as the coefficient of auto-correlation and it can be calculated from the function $u(t)$ by the following formula:

$$p(\tau)=\frac{\int(u(t)-\bar{u})(u(t-\tau)-\bar{u})dt}{\int(u(t)-\bar{u})^2dt} \quad (2)$$

In this formula $\bar{u}$ signifies the time mean of $u(t)$. The graphic representation of $p$ as function of $\tau$ is called an auto-correlogram; three cases of such auto-correlograms are represented in FIGS. 1 to 3 of the drawings.

Figures 2, 3:
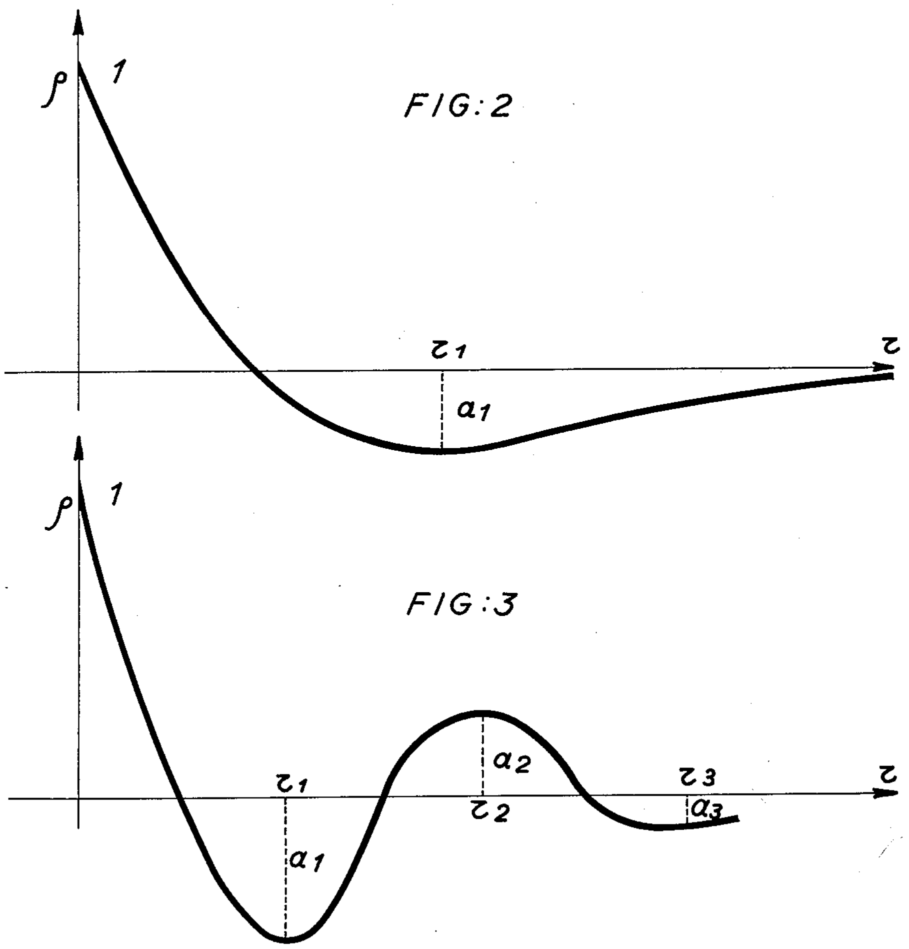

It can be shown that when the first minimum $a_1$ of the auto-correlogram is chosen as coeficient $p$ in the Formula 1 and as time value $\tau_1$ corresponding to $a_1$, as seen in FIG. 2, the approximation becomes optimum, that is to say during transmission of the information contained in the variable $v(t)$ by amplitude modulation the energy necessary to the transmission becomes minimum, or during a transmission by frequency modulation, the frequency band becomes a minimum, which leads likewise to advantages realisable in practice. This novel teaching forms part of the present invention.

When the particular value $a_1$ is chosen for $p$, the approximation of the Formula 1 is accurate in the case where the auto-correlogram corresponds to FIG. 2, or to that of FIG. 3, with particular relations between $a_1$, $a_2$, $a_3$, etc. If in fact the auto-correlogram corresponds to FIG. 3, the part of the information to be anticipated in principle, if account were taken of $a_2$, $a_3$, etc., is contained implicitly in the function $v(t)$ appearing in the Formula 1. The accuracy of the information does not therefore depend on this approximation, but only a residual redundancy of the function $v(t)$ will result from a less close approximation. When the auto-correlogram corresponds to FIG. 1, it is possible to bring back the problem to a case like FIG. 2 or FIG. 3 by differentiating the function $u(t)$ beforehand (as for example in delta modulation and other analogous known systems) and then to convert a function $$\frac{du(t)}{dt}$$

If we consider now again our example, a telemetering device of a coastal battery, this telemetering device has to follow ships of any dead weight or displacement and airplanes of different shapes and propulsion principles. Therefore every vehicle taken as a target by the telemetering device will have a behavior corresponding to another contingent conjectural signal; in other words the auto-correlation function of the successive coordinates will be different from one target to the other.

If therefore the above-mentioned fundamental idea of the invention has to be applied, by way of example to such a telemetering device of a coastal battery, it will be necessary to calculate constantly the autocorrelation function of the measured quantities.

The choice of $a_1$ and $\tau_1$ in the Formula 1 according to the invention allows of providing a resulting practical advantage for the transmission of the information contained in $u(t)$. It can be shown that $$\sigma u^2=\frac{\sigma v^2}{1-a_1^2} \quad (3)$$

where $$\sigma u^2=\int(u(t)-\bar{u})^2dt \quad (4)$$

$$\sigma v^2=\int(v(t)-v)^2dt \quad (5)$$

Since $a_1$ is always real and less than unity, $\sigma u^2$ is always greater than $\sigma v^2$. Another object of the invention is therefore to convert the signal $u(t)$ into a signal $v(t)$ so as to reduce the energy necessary for the transmission of the information or to reduce the width of the frequency band when the transmission is effected by modulation of a carrier wave frequency.

Figures 4, 5:
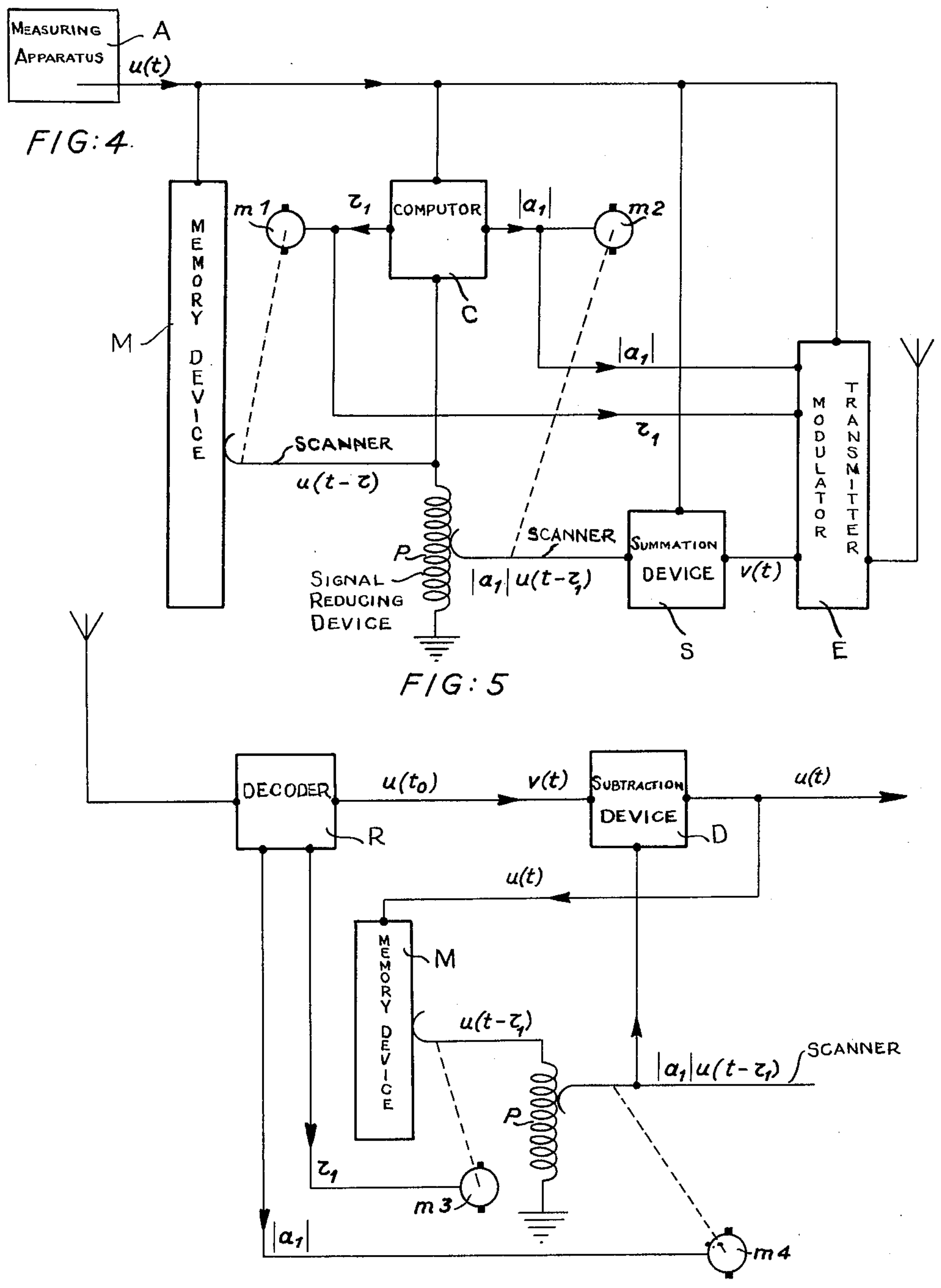
FIG. 4 is a block diagram of the data-transmitting station of a data-telemeter system employing a signal conversion apparatus or device according to the invention.
FIG. 5 is a block diagram of the receiving station of a data-telemeter system according to the invention.

Referring to FIG. 4, a continuously varying signal $u(t)$ comprising the output of metering apparatus A is introduced into a memory device M comprising a multi-tap delay line or a magnetic drum with a displaceable scanner and into a summation device S as shown. A preceding value of $u$; viz $u(t-\tau)$, is extracted from the memory device M, reduced by a factor $-p$, for example $|a_1|$, in a reducing device P and brought simultaneously with the value $u(t)$ to the summation device S. The latter then furnishes a variable $v(t)=u(t)+|a_1|u(t-\tau_1)$ which is introduced into a modulator-transmitter E in which the function $v(t)$ is converted into modulated signals, and transmitted for example in one of the channels of a multiplex system. The RF transmitter E transmits in addition, at the start of each period of transmission, the value of $u(to)$, wherein $to$ is the time at which the transmission begins. The values of $|a_1|$ and of $\tau_1$ may be fixed or variable. When they are fixed, they may be set once for all. When the value of $u(t)$ is reduced by a factor $a_1$ variable with time, it is necessary to calculate $|a_1|$ and $\tau_1$ constantly. They may for example be variable with the changes of the co-ordinates of an airborne vehicle flying at different altitudes, where the density of the air is different. In such cases, there is provided a calculator, C, for example a digital or analog computer of current design able to calculate the function $p(t)$ as defined by the Formula 1 and delivering the abscissa and ordinate of the first minimum of this function. As represented this calculator has inputs for $u(t)$ and $u(t-\tau)$ and outputs $\tau_1$ and $|a_1|$. It does not form part of the present invention and consists of the following well known elements: A device to calculate $\bar{u}$, the mean of the function $u(t)$ connected to a first subtraction device calculating $(u(t)-\bar{u})$ and to a second subtraction device calculating $(u(t-\tau)-\bar{u})$, a multiplication device receiving the outputs of the first and second subtraction device calculating $(u(t)-\bar{u})(u(t-\tau)-\bar{u})$, a first integration device for this product, a second multiplication device receiving the output of the second subtraction device computing $$(u(t)-\bar{u})^2$$

a second integration device for the last named product, a dividing device for dividing the first integral by the second integral, a derivating device calculating the derivative of the function $p(t)$ furnished by the dividing device, a zero value detector for the function furnished by the derivating device which feeds $\tau_1$ to the output of the calculator C and to an amplitude measuring device of the function $p(t)$; this amplitude measuring device feeds $a_1$ to the output of the calculator C.

The two setting values $\tau_1$ and $|a_1|$ control a servomotor system $m_1$ adjusting $\tau_1$ in the memory device M, and another servomotor system $m_2$ adjusting $p$ or $|a_1|$ in the reducing device P. The values of $\tau_1$ and $|a_1|$ are in addition introduced into the modulator-transmitter E in order to be transmitted at regular intervals for example into a particular channel of the transmitter. The selected channel may serve for the transmission of the values $|a_1|$ and $\tau_1$ of several different variables $u_1(t) \ldots u_n(t)$, whereas each differing variable $u_1(t) \ldots u_n(t)$, that is to say $v_1(t) \ldots v_n(t)$, will require a separate channel for its transmission. At the receiving station (FIG. 5), the signals are introduced into a decoding or demodulating receiver R which delivers as an output signal first the starting signal $u(to)$ and then the signal $v(t)$. The decoder R also delivers signals representative of the values $|a_1|$ and $\tau_1$ to servomotors $m_4$ and $m_3$ respectively as shown.

A subtraction device D receives simultaneously the signal $v(t)$ and the value $|a_1|u(t-\tau_1)$, obtained by a memory device M and a reducing device P, similar to the corresponding devices represented in FIG. 4, will reproduce the function $u(t)=v(t)-|a_1|u(t-\tau_1)$.

During the first period $\tau_1$, at the start of the reception, the memory device does not furnish the value $u(t-\tau_1)$. During this starting period the value $u(to)$ is transmitted. It will be understood that *to* signifies the variable $t$ during the first interval $\tau_1$. Servomotor systems $m_3$ and $m_4$ allow $\tau$ and $|a_1|$ to be varied according to the information decoded in the demodulating receiver R.

Figure 6:
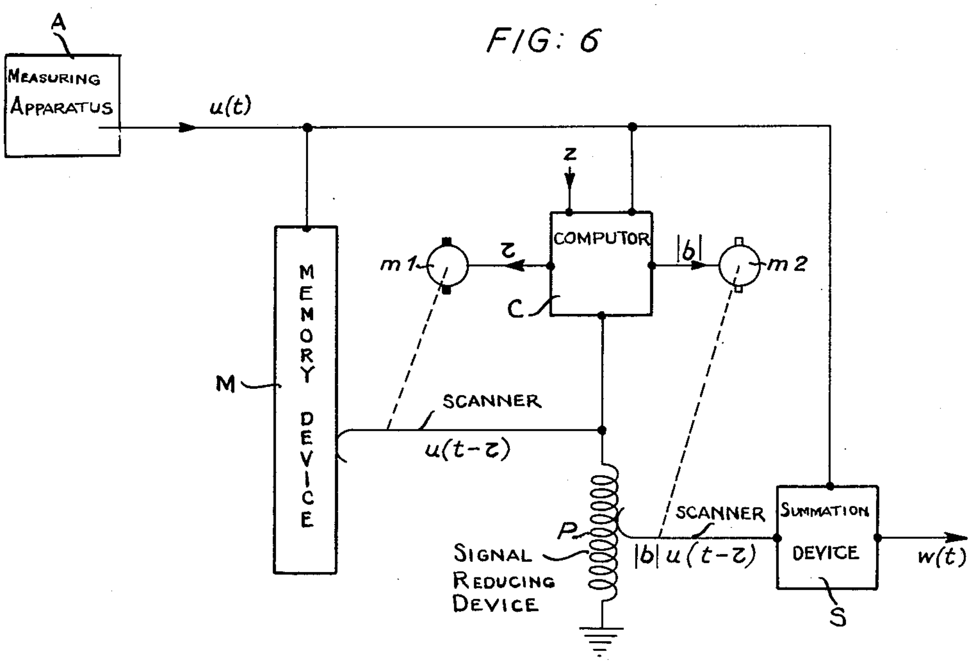
FIG. 6 is a block diagram of a modification of the data-transmitting station shown in FIG. 4.

When it is desired solely to eliminate the errors introduced into the signal by a measuring apparatus, the invention may be used without transmission devices, solely for eliminating this error. In this case the only object is to obtain a signal $w(t)$, representative of the physical quantity being metered and free of error. In this instance $\tau$ and $p$ are characteristics of the autocorrelation function of the output of the measuring apparatus in the hypothetical case when the input of the measuring apparatus is purely random. Generally this autocorrelation function may be calculated once for all but $\tau$ and $p$ can still vary, for example, according to whether they are at one or other end of the range of measurement of the apparatus. The block diagram of such an arrangement is shown in FIG. 6.

The value $u(t)$ signifies the signal representative of the physical quantity being metered by means A and may include a redundant signal having supplementary redundancy introduced by the measuring apparatus. A final output signal $w(t)$ is the signal corresponding to the physical quantity and is free of the above mentioned supplementary redundancy or error. The principle of operation is identical with that of FIG. 4 the component units of which are similar to the apparatus in FIG. 4 and have the same reference letters, but the calculator is fed in addition by a signal $z$ supplied by the metering or measuring apparatus A to take into account the range or any other characteristics of this measuring apparatus. Thus, the calculator C can set $|b|$ (a particular value of $p(t)$ and $\tau$) in such a way as to eliminate the deformation of the signals arising from the inertia of the measuring apparatus, so as to restore a signal $w(t)=u(t)+|b|u(t-\tau)$, in conformity with the original physical magnitude.

While preferred embodiments of the invention have been illustrated and described, it will be understood that the invention is in no way limited to these embodiments and that many changes may be made within the spirit and scope of the invention as defined by the following claim.

What I claim and desire to secure by Letters Patent is:

In a signal conversion apparatus for developing at least one signal representative of a physical quantity being measured, a receiving station comprising, decoding means for receiving an incoming signal transmitted from a data-transmission station and for evolving a plurality of outputs, the received signal having superimposed information content representative of the physical quantity being measured, a subtraction device connected to receive a first output signal from the decoding means as a first input thereto, means connected to receive an output signal from the subtraction device comprising a memory device and means connected to the decoding means and responsive to a second output signal from the decoding means for variably time-delaying the output signal from the subtraction device, reducing means cooperative with the memory device including variable means responsive to a third output signal from the decoding means for receiving the time-delayed output signal of the subtraction device for reducing the last-mentioned signal by a selected factor, and means for applying the time delayed and reduced signal output of said reducing means to the subtraction device as a second input whereby the output of the subtraction device constitutes a signal representative of the values of the measured quantity transmitted from the data-transmission station.

References Cited in the file of this patent

UNITED STATES PATENTS

| | | |
|---|---|---|
| 1,851,090 | Fetter | Mar. 29, 1932 |
| 2,539,623 | Heising | Jan. 30, 1951 |
| 2,580,148 | Wirkler | Dec. 25, 1951 |
| 2,638,586 | Guanella | May 12, 1953 |
| 2,718,638 | De Rose et al. | Sept. 20, 1955 |
| 2,767,914 | Merrill et al. | Oct. 23, 1956 |
| 2,904,778 | Weir | Sept. 15, 1959 |

OTHER REFERENCES

Chelustkin: The Design and Application of Correlation Control, Automatic Control, May 1958, pp. 16–20.